United States Patent [19]

Lackowski

[11] Patent Number: 5,299,754
[45] Date of Patent: Apr. 5, 1994

[54] FERROMAGNETIC INSERT FOR USE WITH A MAGNETIC TAPE CARTRIDGE AND METHOD OF MANUFACTURING THE SAME

[75] Inventor: Robert Lackowski, Mt. Prospect, Ill.

[73] Assignee: Overland Bolling Company, Franklin Park, Ill.

[21] Appl. No.: 857,505

[22] Filed: Mar. 25, 1992

[51] Int. Cl.$^5$ ............................................. B65H 75/18
[52] U.S. Cl. ...................................... 242/197; 242/198
[58] Field of Search .............. 242/197, 198, 199, 68.5, 242/71.8, 68.3; 411/531, 544, 154, 155; D8/399

[56] References Cited

U.S. PATENT DOCUMENTS

| | | | |
|---|---|---|---|
| 2,943,661 | 7/1960 | Stern | 411/134 |
| 3,298,625 | 1/1967 | Babcock | 242/71.8 |
| 3,856,066 | 12/1974 | Reynolds | 411/155 |
| 4,254,922 | 3/1981 | Wolf et al. | 242/194 |
| 4,343,441 | 8/1982 | Graham | 242/68.1 |
| 4,376,606 | 3/1983 | Peterson | 411/531 X |
| 4,723,731 | 2/1988 | Posso | 242/197 |
| 4,970,748 | 11/1990 | Rubey | 15/97.1 |
| 5,029,771 | 7/1991 | Ranoia | 242/197 |

FOREIGN PATENT DOCUMENTS

| | | | |
|---|---|---|---|
| 0103274 | 5/1926 | Australia | 411/531 |
| 1186464 | 4/1970 | United Kingdom | 411/531 |

Primary Examiner—Daniel P. Stodola
Assistant Examiner—John Rollins
Attorney, Agent, or Firm—Burns, Doane, Swecker & Mathis

[57] ABSTRACT

An insert that is to be mounted on a hub of a spool positioned in a magnetic tape cartridge for permitting the spool to be attracted to the magnetic element of a computer drive mechanism includes a circular ferromagnetic disk having oppositely positioned first and second planar surfaces. The disk is provided with a centrally positioned through hole, and a plurality of securing through holes for permitting the ferromagnetic disk to be secured to the spool hub of a magnetic tape cartridge. The disk includes an annular flange that extends around the outer periphery of the disk and axially away from the first planar surface. The ferromagnetic disk has a thickness as measured between the first and second planar surfaces that is less than 1.35 mm. The disk can also include an annular flange that surrounds the centrally positioned hole and that extends axially away from the first planar surface. Also, the disk can be provided with an annular flange that surrounds each of the securing through holes and that extends axially away from the first planar surface. Each of the annular flanges that surrounds the securing holes can have a radially inwardly directed shoulder that allows the ferromagnetic disk to be securely attached to the hub of the spool of the magnetic tape cartridge.

23 Claims, 2 Drawing Sheets

FERROMAGNETIC INSERT FOR USE WITH A MAGNETIC TAPE CARTRIDGE AND METHOD OF MANUFACTURING THE SAME

FIELD OF THE INVENTION

The present invention pertains to an insert for use with a magnetic tape cartridge. More particularly, the present invention relates to a ferromagnetic insert that is to be attached to the hub of a spool positioned within a magnetic tape cartridge for permitting the spool to be attracted to a magnetic element of a computer drive mechanism to thereby result in rotation of the spool.

BACKGROUND OF THE INVENTION

It is known that the storage of data on a recording medium can be accomplished through use of magnetic storage techniques. Magnetic tape is highly desirable because it provides a good medium for storing large amounts of computer data and information. Typically, these magnetic tapes are stored in magnetic tape cartridges. One type of magnetic tape cartridge that is widely used in the industry is referred to as the 3480 cartridge or data card. This type of magnetic tape cartridge is illustrated in FIG. 1.

The cartridge 10 includes a housing 12 having an opening 14 in one corner for permitting the passage of the magnetic tape in and out of the cartridge 10. A centrally positioned opening 16 is provided in the housing 12 to permit access to a unit 18 that is engaged by a computer drive mechanism (not shown) for winding and unwinding the magnetic tape.

As seen in more detail in FIG. 2, the unit 18 includes a spool 20 that is adapted to receive the magnetic tape (not shown). The spool 20 is provided with a hub 22 having teeth 24 on the outer face thereof. These teeth 24 extend around the outer periphery of the hub 22. The hub 22 is also provided with teeth 26 on the inner surface thereof that are adapted to mate with teeth 28 provided on a locking mechanism 30.

The locking mechanism 30 is provided with a hollow stem 32 that is received on an upstanding lug 34 which is fixed to the housing 12. A spring 36 encircles the outer surface of the stem 32 and provides a biasing force that tends to urge the locking mechanism 30 towards the opening 16 in the housing 12. The upstanding lug 34 and the hollow portion of the stem 32 are suitably shaped to ensure that the locking mechanism 30 does not rotate relative to the housing 12.

When the cartridge 10 is not in use (i.e., is not positioned within a computer drive), the spring 36 urges the locking mechanism 30 towards the opening 16 such that the teeth 28 on the locking mechanism 30 engage the teeth 26 provided on the hub 22. In that way, the spool 20 is prevented from rotating. On the other hand, when the cartridge 10 is positioned within the computer drive (not shown) an element on the driving mechanism engages a projection 38 formed on the locking mechanism 30 and pushes the locking mechanism 30 away from the hub 22 of the spool 20. As a result, the teeth 28 on the locking mechanism 30 become disengaged from the teeth 26 on the hub 22 so that the spool 22 is free to rotate.

The driving mechanism (not shown) is provided with teeth that engage the teeth 24 on the hub 22 of the spool 20 in order to drive the spool 20 and thereby result in winding or unwinding of the magnetic tape around the spool 20.

The front face of the spool hub 22 has a ferromagnetic insert 40 secured thereto. The drive mechanism (not shown) is provided with a magnetic portion that attracts the ferromagnetic insert 40, and thus the spool 20, so as to result in engagement of the teeth on the drive mechanism (not shown) with the teeth 24 on the spool hub 22.

As can be seen in FIG. 1, the ferromagnetic insert 40 is provided with a centrally located opening 42 for permitting access to the projection 38. The insert 40 is also provided with several other holes 44 for securing the ferromagnetic insert 40 to the plastic hub 22. The spool hub 22 is typically fabricated of plastic material and can be provided with upstanding plugs that extend through the holes 44 in the ferromagnetic insert 40. Once the ferromagnetic disk 40 is mounted on the spool hub 22 with the plastic plugs extending through the holes 44, the plastic plugs on the hub 22 can be heated and slightly melted in any suitable way, such as by sonic welding, so that the plastic fills the holes 44. In this way, the insert 40 becomes attached to the hub 22.

Referring to FIG. 3, the holes 44 in the insert 40 are typically formed by first punching the insert 40 to result in holes having a diameter that is slightly smaller than the ultimate diameter. Thereafter, a punching operation is performed from both sides of the insert 40 with a slightly larger punch so as to result in holes 44 having the desired diameter. This finishing punch operation results in the formation of annular ridges 46 on the inner surface of the holes 44. These annular ridges help provide a positive attachment of the plastic plugs on the spool hub to the disk 44.

In practice, it is necessary that this finishing punch operation be performed from both sides of the insert 40 to ensure that the resulting insert 40 is symmetrical (i.e., symmetrical about a plane located midway between opposite faces of the insert). In that way, the insert 40 can be mounted on the spool hub with either of the faces of the insert facing the spool hub. If this finishing punch operation were only carried out from one side of the insert, the result would be a non-symmetrical insert (i.e., non-symmetrical about a plane located midway between opposite faces of the insert). Such a non-symmetrical insert could only be mounted on the spool hub in one way and would require painstaking effort to ensure that the insert 40 is positioned on the hub 22 in the appropriate manner. Such painstaking efforts would not be conducive to facilitating attachment of the inserts 40 to the hub 22 in a relatively expedient and possibly automated manner.

Unfortunately, there are several disadvantages associated with the known types of ferromagnetic inserts such as illustrated in FIG. 3. In one respect, since the finishing punch operation is carried out from both sides of the insert 40, the resulting insert typically includes two annular ridges 46 that are spaced apart by a space 48. During use, when the ferromagnetic insert 40 is attracted to the magnetic element on the computer driving mechanism, the insert 40 must be able to withstand a certain pull-out force. In that regard, the spaced-part annular ridges 46 and their interaction with the plastic plugs extending from the hub 22 may not be sufficient to withstand this pull-out force. Indeed, the relatively thin nature of the annular ridges 46 may not be capable of withstanding the repeated force that tends to pull the insert 40 away from the spool hub. Moreover, since the annular ridges 46 only extend a very short distance towards the center of te hole 44, the annular ridges 46 may not provide sufficient interaction with the plastic plugs on the spool hub so as to withstand the repeated force that tends to pull the disk 40 away from the spool hub. Over time, this may result in loosening of the insert 40 relative to the spool hub 22.

Another disadvantage associated with the known type of insert 40 is that it is relatively costly to manufacture. This derives from the fact that the thickness of the insert 40 is 1.55 mm. As the inventor herein has discovered, the function served by the insert 40 does not require that the insert 40 possess such a thickness. Indeed, it has been found that certain advantages can actually be achieved by fabricating the insert to have a much smaller thickness.

SUMMARY OF THE INVENTION

In light of the foregoing, the present invention provides a ferromagnetic insert for use with magnetic tape cartridges that is much less expensive and that is much better suited to remaining securely attached. to the spool hub of the magnetic tape cartridge, even during repeated use.

In accordance with one aspect of the present invention, a magnetic tape cartridge for housing a tape which is adapted to have data stored thereon includes a housing, and a rotatable spool that is positioned within the housing and that is adapted to have the magnetic tape wound thereon. The spool includes a hub, and the hub is provided with means for being engaged by a computer drive mechanism in order to rotatably drive the spool. The hub has a ferromagnetic disk mounted thereon and the ferromagnetic disk is provided with a plurality of through holes. The ferromagnetic disk has a thickness that is less than 1.35 mm.

In accordance with a preferred embodiment of the present invention, the ferromagnetic disk is provided with an annular flange that extends around the outer periphery of the disk and that extends axially away from a first planar surface of the disk. The holes in the disk include a centrally positioned hole and a plurality of securing holes that are positioned radially outwardly from the centrally positioned hole. The centrally positioned hole is surrounded by an annular flange that extends axially away from the first planar surface. In addition, each of the plurality of securing holes is surrounded by an annular flange that extends axially away from the first planar surface, and the annular flange that surrounds each of the securing holes has a radially inwardly directed annular shoulder for allowing the disk to be firmly and reliably secured to the hub of the spool.

In accordance with another aspect of the present invention, an insert that is to be mounted on a hub of a spool positioned within a magnetic tape cartridge for permitting the spool to be attracted to a magnetic element of a computer drive mechanism comprises a circular ferromagnetic disk having oppositely positioned first and second planar surfaces. The disk is provided with a centrally positioned through hole and a plurality of securing through holes that are located radially outwardly of the centrally positioned through hole for permitting the ferromagnetic disk to be secured to the hub of the spool. The ferromagnetic disk is provided with an annular flange that extends around the outer periphery of the disk and axially away from the first planar surface. The ferromagnetic disk has a thickness measured between the first and second planar surfaces that is less than 1.35 mm.

In accordance With the preferred embodiment of the insert, an annular flange surrounds the centrally positioned hole and extends axially away from the first planar surface. The disk is also provided with an annular flange that surrounds each of the securing holes and that extends axially away from the first planar surface. Each of the annular flanges that surrounds the securing holes is provided with a radially inwardly directed shoulder so that the size of each of the securing holes that opens to the first planar surface is greater than the size of the securing hole in the area of the shoulder.

In accordance with another aspect of the present invention, an insert that is to be mounted on a hub of a spool that is positioned within a magnetic tape cartridge for permitting the spool to be attracted to a magnetic element of a drive mechanism comprises a circular ferromagnetic disk having oppositely positioned first and second planar surfaces. The disk is provided with an annular flange that extends around the outer periphery of the circular disk and that extends axially way from the first planar surface. The ferromagnetic disk also includes a centrally positioned through hole for accessing a spring biased locking element of the magnetic tape cartridge, and a plurality of securing through holes for securing the disk to the hub of the spool. The securing holes are positioned radially outwardly of the centrally positioning through hole at equal distances from the centrally positioned through hole. The centrally positioned through hole includes an annular flange that extends around a periphery of the centrally positioned through hole and extends axially away from the first planar surface.

In accordance with the preferred embodiment of the insert, each of the securing holes has an annular flange that extends around the periphery of the securing hole and that extends axially away from the first planar surface. The annular flange of each of the securing holes has a radially inwardly directed shoulder so that the size of each of the securing holes that opens to the first planar surface is greater than the size of the securing hole in the area of the shoulder. The radially inwardly directed shoulders allow the ferromagnetic disk to be securely and reliably attached to the hub of the spool.

In accordance with an additional aspect of the present invention, a method of manufacturing an insert that is to be attached to a hub of a spool positioned in a magnetic tape cartridge for permitting the spool to be attracted to a magnetic element of a computer drive mechanism includes the steps of providing a piece of ferromagnetic material, forming a first through hole in the piece of ferromagnetic material, determining the position of attachment means located on the spool hub for attaching the insert to the hub, forming securing through holes in the piece of ferromagnetic material in correspondence with the determined position of the attachment means on the spool hub, cutting a circular disk from the strip of ferromagnetic material that encompasses the first through hole and the securing through holes, and forming an annular flange on the circular disk that extends around the outer periphery of the disk and that extends axially away from a first planar surface of the disk.

In accordance with the preferred embodiment of the method, the disk that is cut from the strip of ferromagnetic material is cut such that the first through hole is centrally positioned in the disk. Also, the method can include the formation of an annular flange that extends around an outer periphery of the first through hole and that extends axially away from the first planar surface. An additional step involves forming an annular flange that extends around the outer periphery of each of the securing through holes and that extends axially away from the first planar surface, and forming radially inwardly directed shoulders at the free end of each of the annular flanges that surrounds the periphery of the securing through holes. The piece of ferromagnetic material that is used to form the circular disk preferably has a thickness less than 1.0 mm.

BRIEF DESCRIPTION OF THE DRAWING FIGURES

DETAILED DESCRIPTION OF THE PREFERRED EMBODIMENTS

Figure 4:
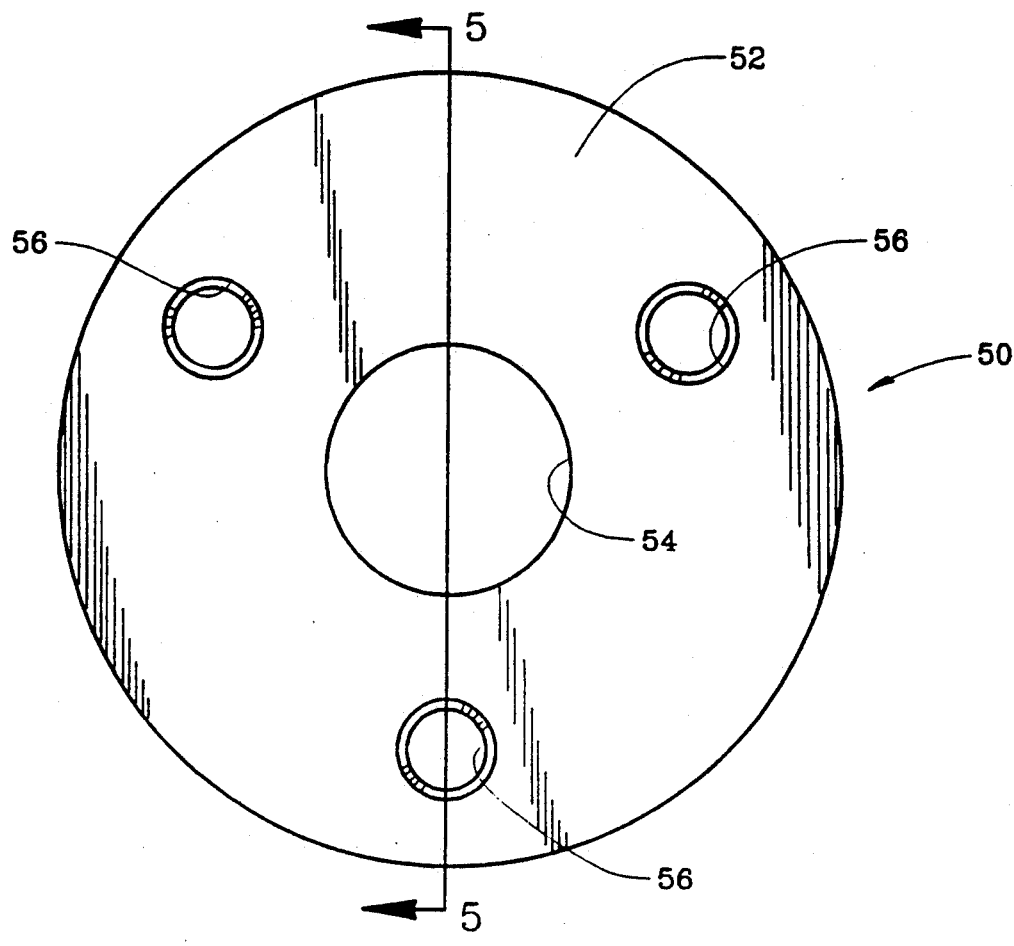
FIG. 4 is a top view of the ferromagnetic insert according to the present invention.

With reference initially to FIG. 4, the insert 50 in accordance with a preferred embodiment of the present invention for use with a magnetic tape cartridge includes a circular disk 52 of ferromagnetic material. The ferromagnetic disk 52 can be fabricated of 410 or 416 stainless steel, or any other suitable ferromagnetic material.

The ferromagnetic disk 52 is provided with a centrally positioned through hole or aperture 54 that extends completely through the disk 52. This centrally positioned through hole 54 permits access to the projection that is formed on the locking mechanism of the magnetic tape cartridge so that the locking element can be released when necessary to effect winding or unwinding of the magnetic tape on the spool.

The ferromagnetic disk 52 is also provided with three securing through holes 56 that allow the ferromagnetic disk 52 to be secured to the plastic hub of the spool. Each of the securing through holes 56 is positioned radially outwardly and at substantially equal instances from the center of the through hole 54. In addition, the securing through holes 56 are equally spaced from one another on an arc of approximately 120°. In that way, the securing through holes 56 are spaced apart from one another and relative to the centrally positioned through hole 54 in the same manner that the holes 42, 44 are positioned on the prior art disk illustrated in FIG. 3. As a result, the circular ferromagnetic disk 52 according to the present invention can be used in place of known inserts without the need for redesigning the hub on which the circular ferromagnetic disk 52 is mounted. Of course, the arrangement of the securing through holes 56 can be varied if desired, as can the number and shape of the securing through holes 56.

Figure 5:
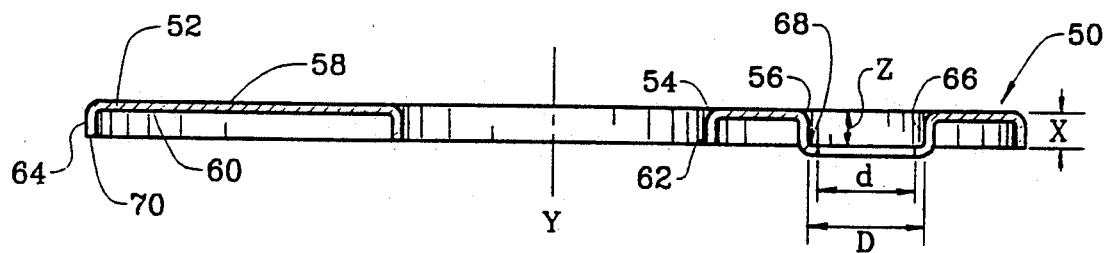
FIG. 5 is a cross-sectional view of the ferromagnetic insert according to the present invention along the section line 5—5 in FIG. 4.

As seen in the cross-sectional view of the disk depicted in FIG. 5, the disk 52 includes a first generally planar surface 58 and an oppositely positioned second generally planar surface 60. The centrally positioned through hole 54 is surrounded with an annular flange 62 that extends axially away from the first planar surface 54. This annular flange 62 surrounds the entire periphery of the centrally positioned through hole 54. Additionally, the outer periphery of the circular ferromagnetic disk 52 has an annular flange 64 extending axially away from the first planar surface 58. This axially extending annular flange 64 extends around the entire periphery of the circular ferromagnetic disk 52.

Each of the securing through holes 56 is also surrounded by an annular flange 66 that extends around the entire periphery of the respective securing through hole 56. These annular flanges 66 extend axially away from the first planar surface 58 and surround the entire periphery of the respective securing through hole 56. Each of the axially extending annular flanges 66 that surrounds the securing through holes 56 is provided with a radially inwardly directed annular shoulder 68.

These radially inwardly directed annular shoulders 68 result in the securing through holes 56 having a diameter D on the first planar surface 58 that is greater than the diameter d in the area of the inwardly directed annular shoulders 68. Thus, the inwardly directed shoulders 68 form a ledge which allows the plastic plugs on the hub of the spool to be strongly and securely seated in place once the circular ferromagnetic disk 52 is mounted on the spool and the plastic plugs are suitably heated and melted such as by sonic welding. The ledge formed by the inwardly directed annular shoulders 68 provides a much stronger mechanism for securely mounting the plastic plugs on the hub than do the annular ridges 46 that are formed in the through holes 44 of the prior art disk shown in FIG. 3. This contributes to an increased pull-out resistance of the ferromagnetic disk 52 relative to the spool hub. By way of example, the shoulders 68 can have a dimension measured radially inwardly toward the center of the securing through hole 56 of approximately 0.75 mm.

It is to be noted that the annular flanges 66 that surround the securing through holes 56 extend axially away from the first planar surface 58 by a distance that is slightly greater than the distance which the annular flanges 62, 64 surrounding the centrally positioned through hole 54 and the periphery of the disk 52 respectively extend axially away from the first planar surface 58.

There are several significant advantages associated with the ferromagnetic disk 52 according to the present invention as illustrated in FIGS. 4 and 5. In one respect, the disk is much thinner than known disks and this reduction in material significantly reduces the costs associated with fabricating this portion of the magnetic tape cartridge. The thickness throughout the ferromagnetic disk is less than 1.35 mm and is preferably less than 1.0 mm. In practice, it has been found that the thickness of the ferromagnetic disk can be in the range of 0.25 mm and about 0.50 mm, with the preferred thickness of the disk being approximately 0.30 mm.

Figure 1:
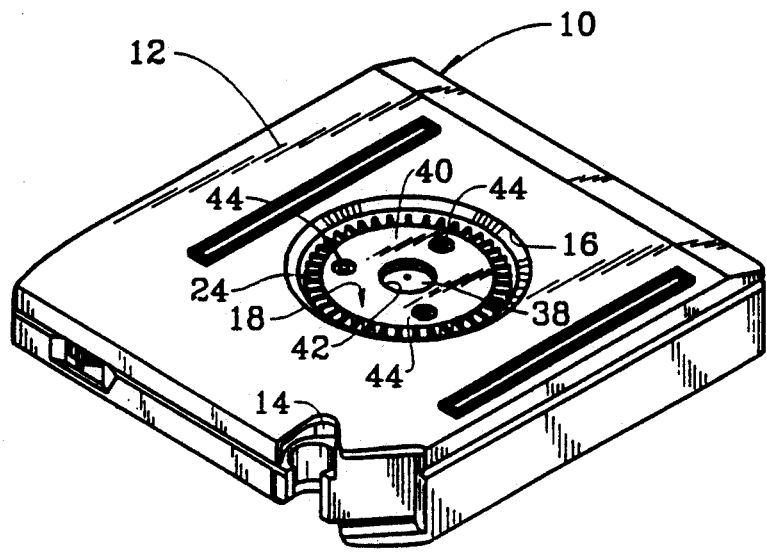
FIG. 1 is a top perspective view of a known type of magnetic tape cartridge.
Figure 2:
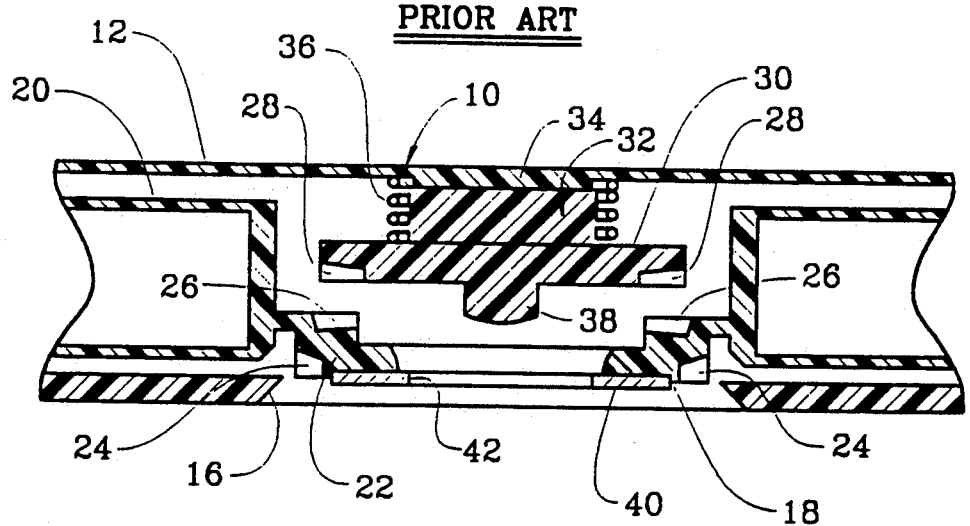
FIG. 2 is a cross-sectional view of a portion of the magnetic tape cartridge illustrated in FIG. 1.

By fabricating the disk of material having a thickness of approximately 0.30 mm, it has been found that the disk according to the present invention can be fabricated for less than one-half the cost associated with fabrication of prior art disks. Given the extensive and widespread use of magnetic tape cartridges of the type illustrated in FIGS. 1 and 2, this cost savings is quite significant to both manufacturers of the ferromagnetic disk as well as those that purchase the disk for use in the manufacture of magnetic tape cartridges.

As can be readily seen from FIG. 5, the ferromagnetic disk 52 according to the present invention is also non-symmetrical about a median plane passing between the first and second planar surfaces 58, 60. This non-symmetrical design of the disk is useful in that it provides an easy and readily apparent mechanism for determining how the disk 52 should be mounted on the spool hub of the magnetic disk cartridge. In particular, the non-symmetrical nature of the ferromagnetic disk 52 according to the present invention provides a readily apparent mechanism for determining that the second planar surface 60 of the ferromagnetic disk 52 should face the spool hub of the magnetic tape cartridge. In this way, it is possible to employ automated machinery for mounting the ferromagnetic disks 52 on the spool hub of the magnetic tape cartridge.

Figure 3:
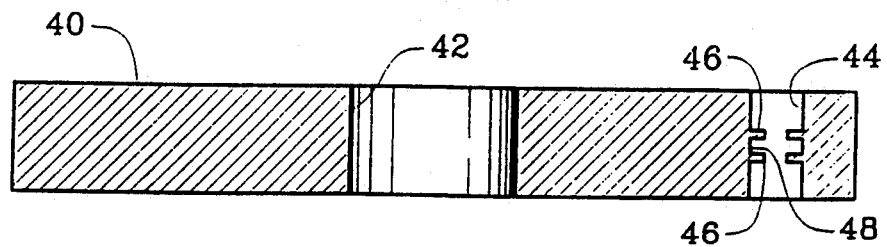
FIG. 3 is a cross-sectional view of a known type of ferromagnetic insert for use in conjunction with the magnetic tape cartridge shown in FIG. 1.

The axially extending annular flange 64 that surrounds the outer peripheral surface of the ferromagnetic disk 52 is advantageous in several respects. First, the distance x which the annular flange 64 extends away from the first planar surface 58 substantially corresponds to the thickness associated with prior art disks such as illustrated in FIG. 3. Thus, when mounted on the spool hub of the magnetic tape cartridge, the appearance of the disk 52 resembles the appearance of prior art known disks. In addition, the annular flange 64 serves the important function of preventing dust, dirt and the like from infiltrating into the interior of the magnetic tape cartridge. In the absence of the annular flanges 64, it might be possible for such undesirable particulate matter to pass between the surface of the spool hub and the undersurface (i.e., the second planar surface 60) of the ferromagnetic disk 52. Such foreign material could, of course, cause undesirable problems in the operation of the magnetic tape cartridge.

The annular flange 64 also contributes to maintaining substantially the same moment of inertia that is characteristic of the prior art ferromagnetic disk illustrated in FIG. 3. The standard adopted for the 3480 tape cartridge includes a particular requirement for the moment of inertia of the empty reel. As can be readily appreciated, by making the ferromagnetic disk 52 according to the present invention much thinner than prior art ferromagnetic disks, the moment of inertia of the disk, and consequently the moment of inertia of the empty reel, is affected. However, by providing the annular flange 64 which is located farthest from the rotational center of the disk 52, the moment of inertia of the disk 52, and consequently the moment of inertia of the empty reel, is maintained within acceptable limits and the established standards.

The annular flange 64 that surrounds the periphery of the disk 52, in combination with the annular flange 62 that surrounds the centrally positioned through-hole 54 and the annular flanges 66 that surround the securing through holes 56, also helps contribute significantly to strengthening the disk 52 and providing a much more rigid construction. Given the reduced thickness of the ferromagnetic disk 52 according to the present invention, the strength and rigidity provided by these flanges 62, 64, 66 is highly useful.

Another advantage realized as a result of the construction of the ferromagnetic disk 52 according to the present invention is that the disk 52 is much lighter than prior art known disks such as illustrated in FIG. 3. This reduction in mass allows a quicker response time of the spool in the direction perpendicular to the plane of the disk (i.e., in the direction along the axis Y as seen in FIG. 5). This in turn can reduce the time that is necessary to initiate engagement between the reel and the computer drive mechanism.

As was mentioned above, the radially inwardly directed shoulders 68 on the flanges 66 that surround the securing through holes 56 provide a ledge that is much better suited to securely and reliably attaching the disk 52 to the spool hub. In other words, the ledge formed by the radially inwardly directed shoulder 68 provides a much larger seating surface for the heated and melted plastic plugs on the spool hub, thereby resulting in the ferromagnetic disk 52 being more securely attached to the spool hub. It has been found that this arrangement allows the ferromagnetic disk 52 to withstand a pull-out force in excess of 300 N which is the minimum pull-out force adopted as the standard for the 3480 cartridge. Moreover, because the annular shoulders 68 are spaced from the first planar surface 58 by a significant distance (represented as z in FIG. 5), there is a much greater volume that the plastic material of the plugs on the spool hub can fill when they are heated and slightly melted. This also contributes to a strong attachment of the disk 52 to the spool hub.

To manufacture the ferromagnetic insert 50 according to the present invention, various methods can be employed. In accordance with one preferred method, a multi-slide machine is employed. A strip of material that is slightly wider than the outside diameter of the resulting disk 52 is provided and pilot holes are punched in the strip to material to locate the strip through the multi-slide machine. Portions of the material corresponding to the location of the securing through holes 56 are then drawn to form three recesses or cups. This results in formation of the axially extending annular flanges 66. Thereafter, a hole having a diameter d is then perforated in the center of each of the drawn cups or recesses, thereby resulting in formation of the inwardly directed shoulders 68.

The center hole 54 can then be punched out, preferably with a size that is slightly smaller than the ultimate size of the through hole 54 so as to permit later formation of the axially extending annular flange 62. The material can be lanced to define the outer periphery of the circular disk 52. Preferably, the lancing operation is carried out to result in spaced apart connection points between the disk and the remaining strip of material. The strip of material is lanced such that the diameter of the lanced circle is slightly larger than the ultimate diameter of the disk 52, thereby allowing later formation of the axially extending annular flange 64. Thereafter, the lanced circular strip is blanked in an appropriate manner to produce the axially extending annular flange 64 on the outer periphery of the disk as well as the annular flange 62 that surrounds the centrally positioned through hole 54. The result is the ferromagnetic disk 52 according to the present invention as illustrated in FIG. 5.

Figure 6:
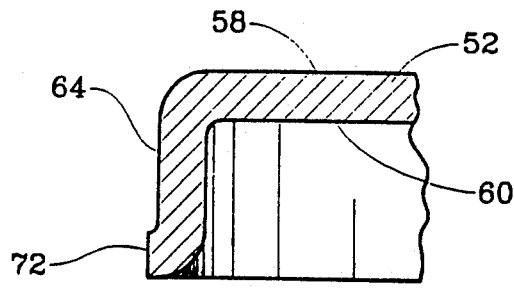
FIG. 6 is an enlarged cross-sectional view of another embodiment of the annular flange portion of the ferromagnetic disk according to the present invention.

As seen in FIG. 5, the axially extending annular flange 64 that surrounds the outer periphery of the disk 52 is constructed such that the free end 70 of the flange 64 lies in a plane that is substantially parallel to the first and second planar surfaces 58, 60 of the ferromagnetic disk 52. As an alternative, and as seen in FIG. 6, the free end 72 of the annular flange 64 can be turned outwardly such that the free end 72 of the annular flange 64 lies in a plane substantially perpendicular to the first and second planar surfaces 58, 60 of the disk 52.

The principles, preferred embodiments and intended use of the present invention have been described in the foregoing specification. However, the invention which intended to be protected is not to be construed as limited to the particular embodiments disclosed. Further, the embodiments described herein are to be regarded as illustrative rather than restrictive. Variations, changes and equivalents may be made by others without departing from the spirit of the present invention. Accordingly, it is expressly intended that all such variations, changes and equivalents which fall within the spirit and scope of the present invention as defined in the claims, be embraced thereby.

What is claimed is:

1. A magnetic tape cartridge for housing magnetic tape which is adapted to have data stored thereon, comprising:
    a housing;
    a rotatable spool positioned within the housing and adapted to have tape wound there around, said spool having a hub, said hub including means for being engaged by a computer drive mechanism to rotatably drive the spool, said hub having a disk mounted thereon, said disk being made of a ferromagnetic material having a maximum thickness less than 1.35 mm, said disk having a plurality of holes extending therethrough and an annular flange extending around an outer periphery of the disk, said annular flange extending away from a first planar surface of the disk.

2. The magnetic tape cartridge according to claim 1, wherein said plurality of holes includes a centrally positioned through hole and a plurality of securing through holes positioned radially outwardly from said centrally positioned through hole, said centrally positioned through hole being surrounded with an annular flange that extends away from said first planar surface.

3. The magnetic tape cartridge according to claim 2, wherein each of said plurality of securing through holes is surrounded by an annular flange extending away from said first planar surface, the annular flange surrounding each of the securing through holes having an inwardly directed annular shoulder so that the diameter of each of the securing through holes on the first planar surface is greater than the diameter of the securing through holes in the area of the inwardly directed annular shoulders.

4. The magnetic tape cartridge according to claim 1, wherein the thickness of the ferromagnetic material from which said disk is fabricated is less than 1.0 mm.

5. The magnetic tape cartridge according to claim 1, wherein the thickness of the ferromagnetic material from which said disk is fabricated is in the range of about 0.25 mm and about 0.50 mm.

6. An insert that is to be attached to a hub of a spool positioned in a magnetic tape cartridge for permitting the spool to be attracted to a magnetic element of a computer drive mechanism, comprising:
    a circular disk having oppositely positioned first and second planar surfaces, said disk being provided with a centrally positioned through hole and a plurality of securing through holes positioned radially outwardly of said centrally positioned through hole for permitting said ferromagnetic disk to be secured to the hub of the spool, said disk having an outer periphery and an annular flange extending around said outer periphery, said annular flange extending away from said first planar surface, aid disk being made of a ferromagnetic material having a maximum thickness that is less than 1.35 mm.

7. The insert according to claim 7, including an annular flange surrounding each of the securing through holes and extending away from said first planar surface, each of said annular flanges that surrounds one of said securing through holes having an inwardly directed shoulder, whereby the size of each securing through hole that opens to the first planar surface is greater than the size of the securing through hole in the area of the radially inwardly directed shoulder.

8. The insert according to claim 7, wherein the thickness of the ferromagnetic material from which said disk is fabricated is less than 1.0 mm.

9. The insert according to claim 8, wherein the thickness of the ferromagnetic material from which said disk is fabricated is in the range of about 0.25 mm and about 0.50 mm.

10. The insert according to claim 6, wherein said securing through holes are positioned equal distances from a center of the centrally positioned through hole and are spaced apart from one another by equal angular arcs.

11. The insert according to claim 6, wherein the annular flange extending around the periphery of the disk has a free end that faces radially outwardly with respect to a central axis of the disk.

12. The insert according to claim 6, wherein said disk is non-symmetrical about a plane extending midway between said first and second planar surfaces.

13. An insert that is to be mounted on a hub of a spool positioned within a magnetic tape cartridge for allowing the spool to be attracted to a magnetic element of a computer drive mechanism, comprising:
    a circular ferromagnetic disk having oppositely positioned first and second planar surfaces, said disk having an outer periphery and an annular flange extending around said outer periphery, said annular flange extending away from said first planar surface, said ferromagnetic disk having a centrally positioned through hole for accessing a spring biased locking element of the magnetic tape cartridge, and a plurality of securing through holes for securing the disk to the hub of the spool, said securing through holes being positioned radially outwardly of said centrally positioned through hole at equal distances from said centrally positioned through hole, said centrally positioned through hole having an annular flange that extends around a periphery of the centrally positioned through hole and that extends away from said first planar surface.

14. The insert according to claim 13, wherein each of said securing through holes has an annular flange extending around a periphery of the securing through hole and extending away from said first planar surface, the annular flange of each securing through hole having an inwardly directed shoulder so that the size of each securing through hole that opens to the first planar surface is greater than the size of the securing through hole in the area of the shoulder.

15. The insert according to claim 14, wherein the thickness of the ferromagnetic material from which said disk is fabricated is less than about 1.0 mm.

16. A method of manufacturing an insert that is to be attached to a hub of a spool positioned in a magnetic tape cartridge for permitting the spool to be attracted to a magnetic element of a computer drive mechanism, said hub being provided with attachment means for attaching the insert to the hub, the method comprising the steps of:

providing a piece of ferromagnetic material having a maximum thickness less than 1.35 mm;

forming a first through hole in said piece of ferromagnetic material;

determining the position of said attachment means on said hub;

forming securing through holes in said piece of ferromagnetic material in correspondence with the determined position of said attachment means, said securing through holes being positioned radially outwardly of said first through hole;

cutting a circular disk from said strip of ferromagnetic material that encompasses said first through hole and said securing through holes; and forming an annular flange on said circular disk that extends around an outer periphery of the disk and that extends axially away from a first planar surface of the disk.

17. The method according to claim 16, wherein said disk is cut from said strip of ferromagnetic material such that the first through hole is centrally positioned on said disk.

18. The method according to claim 17, including the step of forming an annular flange that extends around an outer periphery of the first through hole and that extends axially away from said first planar surface.

19. The method according to claim 16, including the step of forming an annular flange that extends around an outer periphery of each of the securing through holes and that extends axially away from the first planar surface, and forming radially inwardly directed shoulders at a free end of each of the annular flanges that surrounds the periphery of the securing through holes.

20. The method according to claim 16, wherein said step of providing a piece of ferromagnetic material includes providing a piece of ferromagnetic material that is less than 1.0 mm in thickness.

21. A magnetic tape cartridge for housing magnetic tape which is adapted to have data stored thereon, comprising:

a housing;

a rotatable spool positioned within the housing and adapted to have tape wound there around, said spool having a hub, said hub including means for being engaged by a computer drive mechanism to rotatably drive the spool, said hub having a disk mounted thereon, said disk being made of a ferromagnetic material having a thickness less than 1.35 mm, said disk having a plurality of holes extending therethrough, said plurality of holes including a centrally positioned through hole and a plurality of securing through holes positioned radially outwardly from said centrally positioned through hole, said centrally positioned through hole being surrounded with an annular flange that extends away from a first surface of the disk.

22. The magnetic tape cartridge according to claim 21, wherein each of said plurality of securing through holes is surrounded by an annular flange extending away from said first surface, the annular flange surrounding each of the securing through holes having an inwardly directed annular shoulder so that the diameter of each of the securing through holes on the first surface is greater than the diameter of the securing through holes in the area of the inwardly directed annular shoulders.

23. An insert that is to be attached to a hub of a spool positioned in a magnetic tape cartridge for permitting the spool to be attracted to a magnetic element of a computer drive mechanism, comprising:

a circular disk having oppositely positioned first and second planar surfaces, said disk being provided with a centrally positioned through hole and a plurality of securing through holes positioned radially outwardly of said centrally positioned through hole for permitting said ferromagnetic disk to be secured to the hub of the spool, said disk having an outer periphery and an annular flange extending around said outer periphery, said annular flange extending away from said first planar surface, said disk being made of a ferromagnetic material having a thickness that is less than 1.35 mm, and including an annular flange surrounding the centrally positioned through hole and extending away from said first planar surface.

* * * * *